Sept. 22, 1925.                                                                    1,554,319
                              J. L. ZADEK
                                SIGNAL
                         Filed Nov. 29, 1921           2 Sheets-Sheet 1
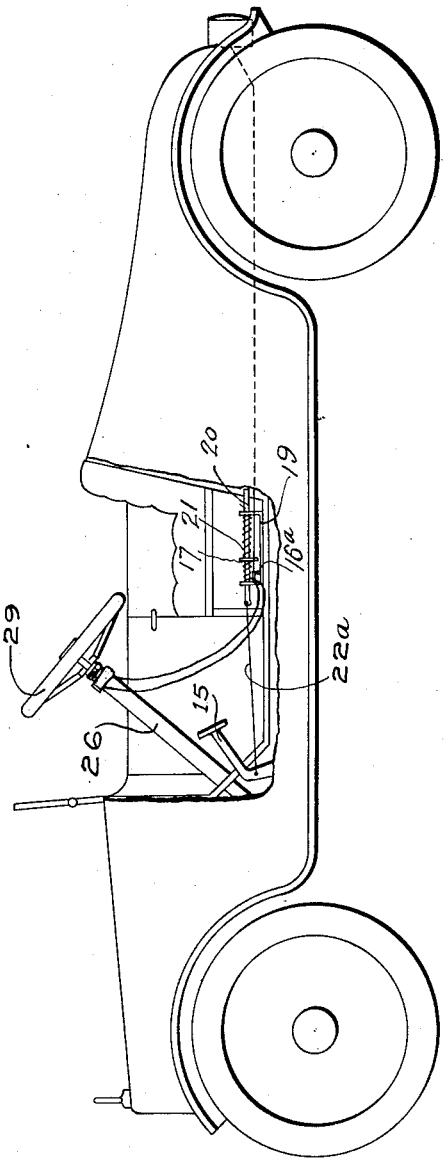
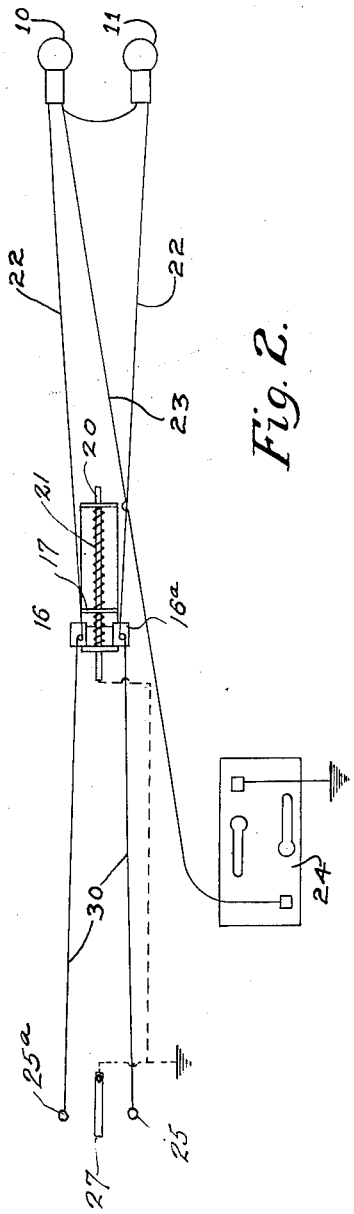
Inventor:
James L. Zadek.
By
   Attorneys.

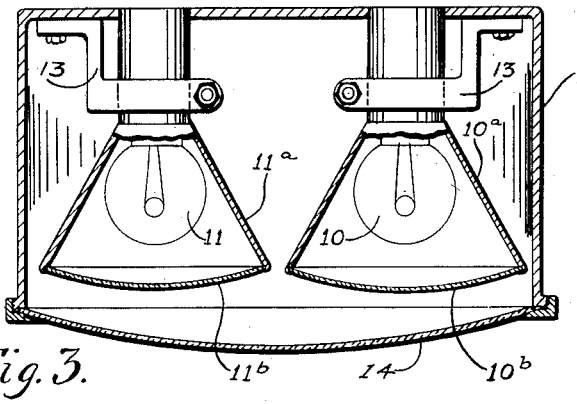
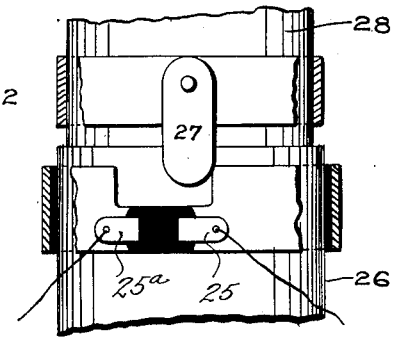
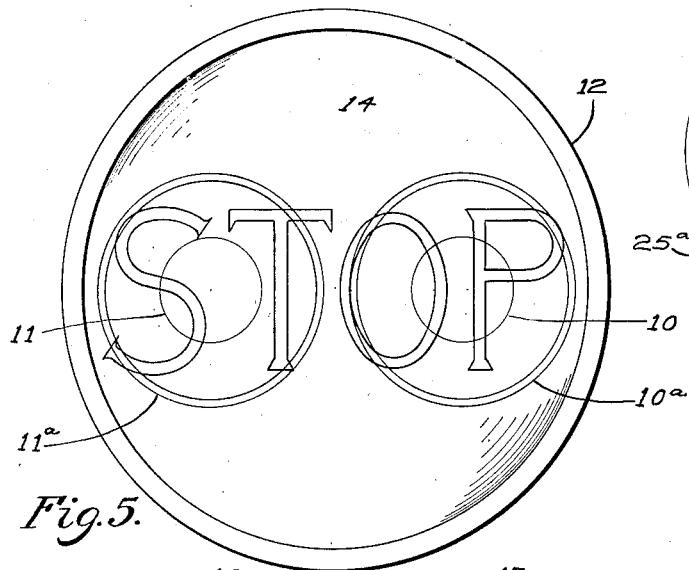
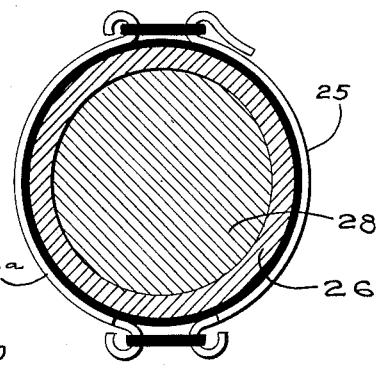
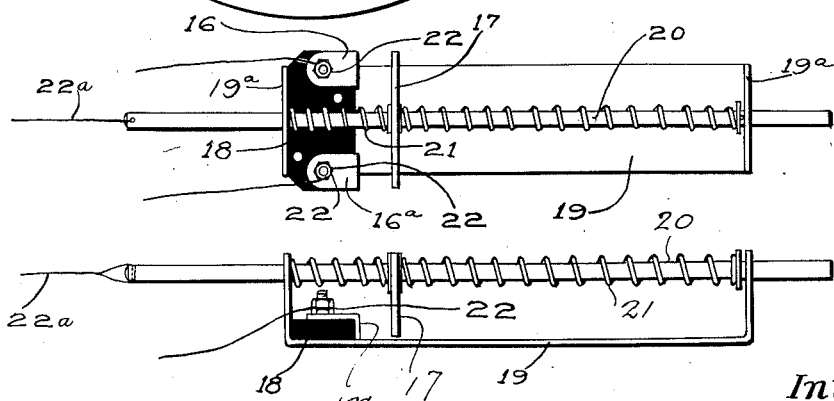

Patented Sept. 22, 1925.

1,554,319

UNITED STATES PATENT OFFICE.

JAMES L. ZADEK, OF OAK PARK, ILLINOIS.

SIGNAL.

Application filed November 29, 1921. Serial No. 518,732.

*To all whom it may concern:*

Be it known that I, JAMES L. ZADEK, a citizen of the United States, residing at Oak Park, in the county of Cook and State of Illinois, have invented new and useful Improvements in Signals, of which the following is a specification.

This invention relates to signal apparatus for motor vehicles, the same being designed to indicate to the traffic behind the car the fact that the driver is about to make a turn or a stop.

The invention has for its object to provide a novel and improved arrangement of signal lamps, and means whereby they are automatically controlled, as will be described in detail hereinafter.

In order that the invention may be better understood, reference is had to the accompanying drawings, forming a part of this specification, and in said drawings:

Figure 1 is an elevation of a motor vehicle showing the application of the invention thereto; Fig. 2 is a wiring diagram; Fig. 3 is a horizontal section of a signal lamp unit; Fig. 4 is an elevation, partly in section, of a steering wheel controlled switch; Fig. 5 is a face view of the signal lamp unit; Fig. 6 is a cross-section of the steering wheel controlled switch; Fig. 7 is a plan view of another switch unit, and Fig. 8 is a side elevation thereof.

Referring specifically to the drawings, the signal apparatus consists of two incandescent electric lamps 10 and 11. The lamp 10 is mounted in a casing $10^a$ having a white or green glass face $10^b$. The lamp 11 is mounted in a casing $11^a$ having a red glass face $11^b$. These two casings are flared in the direction of their glass faces, as clearly shown in Fig. 3.

The lamp casings $10^a$ and $11^a$ are enclosed in a housing 12, the back of the latter carrying suitable supporting brackets 13 for holding said lamp casings in their proper place within the housing. The face of the housing 12 is fitted with a clear glass 14 containing the inscription "Stop", which latter may be painted on the glass. The lamps 10 and 11 are located alongside each other behind the glass 14, and when both lamps are burning the inscription "Stop" is displayed. However, when the driver is about to make a turn to the left, the lamp 11 only will be turned on, so that a red signal light is now displayed through the glass face 14 of the housing 12, and on the left side thereof. If a turn to the right is to be made, the lamp 10 will be turned on, so that there is now displayed through the glass face of the housing and on the right side thereof, a white or green light.

In the circuit of the lamps 10 and 11 are interposed switches for controlling the same. The switch for controlling the lamps separately or selectively is operated by a moving part of the steering gear of the car, whereas the switch by which both lamps are turned on is actuated by some part which is shifted by the driver of the car when he is about to bring the car to a stop, such as the brake or clutch pedal 15 shown in Fig. 1. The last-mentioned switch unit consists of a pair of stationary contacts 16 and $16^a$, and a movable contact 17 which is adapted to bridge the same. The contacts 16 and $16^a$ are mounted on a block 18 of insulating material carried by a base plate 19 secured under the floor of the car at any convenient location to the rear of the brake pedal 15, as shown in Fig. 1. The base plate 19 has upstanding end flanges $19^a$ which support a slidable rod 20, said flanges being apertured to seat the rod, and the latter carrying the contact 17. A spring 21 associated with the rod 20 tends to urge the same rearwardly to hold the contact 17 clear of the contacts 16 and $16^a$. When the driver is about to make a stop, and presses on the brake pedal 15, the movement of the latter, through a connection $22^a$ with the rod 20, draws the same forwardly to bring contact 17 into engagement with contacts 16 and $16^a$, thereby closing the circuits of both lamps 10 and 11, and when the pedal is released, the spring 21 forces the rod 20 rearwardly to disengage contact 17 from contacts 16 and $16^a$, thereby breaking the circuits of the lamps.

The switch just described is a ground switch, the rod 20 being grounded, and the contacts 16 and $16^a$ wired, as shown at 22 to one of the lamp terminals. To the other terminals of the lamps is connected a wire 23 leading from a suitable current source 24 having one side grounded.

The switch unit for controlling the lamp 10 and 11 selectively consists of a pair of stationary contact plates 25 and $25^a$ which are clamped to the steering post 26 of the car, and adapted to be engaged by a movable contact finger 27 secured to the steering shaft 28. Normally, or when the car is going straight ahead, the finger 27 is positioned midway between the contacts 25 and 25ᵃ, but when the steering wheel 29 is operated for making a turn to the left, the turning movement of the shaft 28 carrying the steering wheel brings finger 27 into contact with the contact 25, so that the red light from lamp 11 is now displayed. When the steering wheel is swung around to make a turn to the right, the finger 27 engages contact 25ᵃ so that now the green or white light from lamp 10 is displayed. The contact finger 27 is grounded, and the contacts 25 and 25ᵃ are connected by wires 30 to the contacts 16 and 16ᵃ.

The signal lamp assembly is mounted on the rear of the car and faces rearwardly so as to be plainly visible to the traffic behind the car.

I claim:

A combined direction and stop signal comprising a housing having a transparent lens bearing a stop signal, separate parallel lamp casings arranged side by side within the housing and having permanent different colored lenses spaced rearwardly from said transparent lens and adapted to be separately illuminated to form direction signals, and light bulbs arranged in said casings and adapted to be separately illuminated to separately and fully illuminate the associated colored lenses for direction indicating purposes or simultaneously illuminated to fully illuminate the stop signal on said transparent lens.

In testimony whereof I affix my signature.

JAMES L. ZADEK.